United States Patent [19]

Reed

[11] Patent Number: 5,028,870
[45] Date of Patent: Jul. 2, 1991

[54] SENSOR SYSTEM METHOD AND APPARATUS FOR DISCRIMINATION OF METALLIC OBJECTS BASED ON A VARIATION IN SELF INDUCTANCE

[75] Inventor: Michael A. Reed, Portsmouth, N.H.

[73] Assignee: Environmental Products Corporation, Fairfax, Va.

[21] Appl. No.: 339,657

[22] Filed: Apr. 18, 1989

[51] Int. Cl.⁵ .................... G01N 27/72; G01R 33/12; G01D 5/08; G07F 3/02
[52] U.S. Cl. .................................. 324/236; 324/234; 324/262; 194/319
[58] Field of Search .............. 324/226, 227, 234, 236, 324/239, 262; 194/317, 318, 319, 320

[56] References Cited

U.S. PATENT DOCUMENTS

| | | | |
|---|---|---|---|
| 1,921,031 | 8/1933 | Hoban | 194/101 |
| 3,344,346 | 9/1967 | Halsey | 324/236 |
| 3,676,772 | 7/1972 | Lee | 324/41 |
| 3,869,663 | 3/1975 | Tschierse | 324/226 |
| 3,872,380 | 3/1975 | Gardiner | 324/41 |
| 4,096,432 | 6/1978 | Spencer | 324/3 |
| 4,105,105 | 8/1978 | Braum | 194/100 A |
| 4,230,987 | 10/1980 | Mordwinkin | 324/236 |
| 4,263,551 | 4/1981 | Gregory et al. | 324/233 |
| 4,286,704 | 9/1981 | Wood | 194/100 A |
| 4,354,587 | 10/1982 | Davies | 194/100 A |
| 4,359,148 | 11/1982 | Davies | 194/100 A |
| 4,460,080 | 7/1984 | Howard | 194/100 A |
| 4,470,015 | 9/1984 | Hirschi et al. | 324/329 |
| 4,486,713 | 12/1984 | Gifford | 324/329 |
| 4,488,116 | 12/1984 | Plesko | 324/236 |
| 4,519,307 | 5/1985 | La Barge et al. | 100/99 |
| 4,538,719 | 9/1985 | Gray et al. | 194/100 A |
| 4,700,139 | 10/1987 | Podhrasky | 324/329 |
| 4,717,006 | 11/1988 | Chapman et al. | 194/318 |
| 4,718,559 | 1/1988 | Kenny et al. | 209/571 |

Primary Examiner—Walter E. Snow
Attorney, Agent, or Firm—Finnegan, Henderson, Farabow, Garrett & Dunner

[57] ABSTRACT

A device for discriminating metal in an object is provided including a sense coil and related circuitry, with variations in the self inductance of the sense coil being measured as the object is passed substantially through the center of the coil.

16 Claims, 5 Drawing Sheets 5,028,870

SENSOR SYSTEM METHOD AND APPARATUS FOR DISCRIMINATION OF METALLIC OBJECTS BASED ON A VARIATION IN SELF INDUCTANCE

BACKGROUND OF THE INVENTION

I. FIELD OF THE INVENTION

The invention relates generally to a metal discriminator, and specifically to a discriminating circuit including a sense coil and means for measuring a change in the self inductance of the coil caused by a metallic object placed substantially in the center of the coil.

II. RELATED ART

Previous discriminator systems based on the principle of applying pulsed signals into a sense coil and measuring the loss in voltage potential across the coil versus time that occurs in the coil after the pulse is applied are known. However, these systems tend to be very sensitive to external noise sources and are subject to temperature sensitivity and physical parameters such as cable length.

SUMMARY OF THE INVENTION

Accordingly, it is an object of the present invention to provide a metal discriminator which is insensitive to external noise such as 60 Hz magnetic fields and frequency interference such as motor commutator noise.

It is a further object of the present invention to provide a metal discriminator that provides stable operation over an extended temperature range and which is simple to produce and low in production costs.

FIG. 1a is a cut-away side view showing how a container is transported through the sense coil illustrated in FIG. 1.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a device for discriminating metal in an object, the device including a sense coil, the object being positioned substantially in the center of the coil, means for generating an electrical signal having a first predetermined frequency and applying the signal to the sense coil, means for measuring the self inductance of the sense coil as a function of the voltage across the coil, and means for comparing the measured self inductance with a reference voltage to discriminate metal in the object.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Reference will now be made in detail to the present preferred embodiment of the invention, an example of which is illustrated in the accompanying drawings. Wherever possible the same reference numbers will be used throughout the drawings to refer to same or like parts.

By way of technical background information, the self inductance of a coil is defined as the ratio of the electromotive force of induction to the rate of change of current in the coil. When a metallic object is placed inside the coil, alternating current applied to the coil will induce a secondary current in the metal object. The induced current in the object causes the electromotive force across the coil to vary. Thus, the variations in the self inductance of the coil depend on the composition of the metallic object inside the coil. It is this principle on which the present invention is based.

Figure 1:
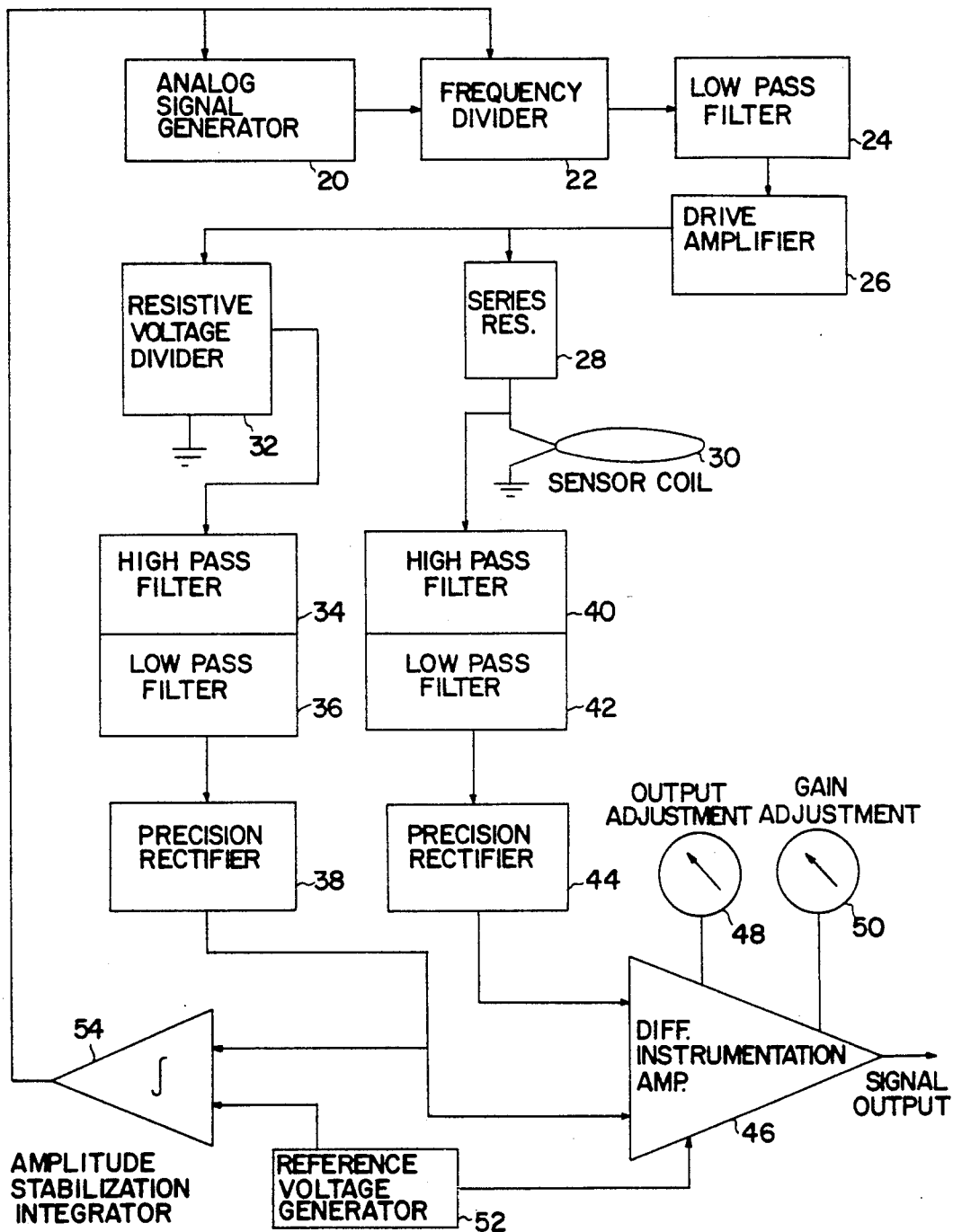
FIG. 1 is a system block diagram showing major components of a metal discriminator embodying the teachings of the present invention.

FIG. 1 illustrates a general system block diagram of a metal discriminator embodying the teachings of the present invention. As shown in FIG. 1, the metal discriminator includes an analog signal generator 20, a frequency divider 22, a low pass filter 24, a drive amplifier 26, a series resistor 28, a sense coil 30, a resistive voltage divider 32, first and second high pass filters 34, 40, first and second low pass filters 36, 42, first and second precision rectifiers 38, 44, a differential instrumentation amplifier 46, an output adjustment 48, a gain adjustment 50, a reference voltage generator 52, and an amplitude stabilization integrator 54.

Analog signal generator 20 is preferably a low cost crystal oscillator which generates an approximately 32.768 kHz square wave signal which is divided by frequency divider 22 to result in a signal having a frequency of 4,096 Hz. Use of a crystal oscillator is preferable to provide necessary temperature and long term time drift stability. This frequency is the region of maximum sensitivity to the variation of the self inductance of a sense coil when aluminum or steel cans are positioned in the center of the coil. Experimental results indicate that an analog signal having a frequency of 4,150 Hz is optimum. At this frequency, the ratio of the decrease in self inductance due to the presence of an aluminum can in the sense coil to the increase in self inductance of the coil due to the presence of a steel can in the coil, is maximum.

The 4,096 Hz square wave output from frequency divider 22 is passed through low pass filter 24, which preferably comprises a fourth order low pass 4,800 Hz filter to strip off the harmonics of the signal leaving a reasonably pure sine wave which is input to drive amplifier 26. Drive amplifier 26 drives series resistor 28, which has a value higher than the inductive reactance of sense coil 30 and resistive voltage divider 32 which has a value equal to the ratio of the value of series resistor 28 to the inductive reactance of sense coil 30. Variations in the self inductance of sense coil 30 due to the presence of metal in the coil cause a variation of the voltage developed across sense coil 30 from the current through series resistor 28.

The signals output from resistive voltage divider 32 and series resistor 28 are passed to identical filter and rectifier circuits. First and second high pass filters 34, 40 are preferably second order 2,300 Hz high pass filters. First and second low pass filters 36, 40 are preferably second order 7,200 Hz low pass filters. Filters 34, 36 and filters 40, 42 each act as a broad band pass filter to reject external noise sources while passing the 4,096 Hz measurement frequency with little attenuation or phase shift. The filtered signals are passed to first and second precision rectifiers 38, 44, each having a 80 Hz filter on the output. By passing the signals from resistive voltage divider 32 and series resistor 28 through identical circuitry, stability over wide ranges of temperature is achieved.

The two DC signals output from first and second precision rectifiers 38, 44 are passed to differential instrumentation amplifier 46 which compares and amplifies the difference between an adjustable fraction of the reference signal coming from resistive voltage divider 32 to the signal coming from series resistor 28 through sense coil 30. Differential instrumentation amplifier 46 is preferably referenced to a 2.5 volt stable reference signal output from reference voltage generator 52. Amplifier 46 can ,e adjusted by output adjustment 48 to give a 2.5 volt output to an external analog-to-digital converter (not shown). The gain of amplifier 46 can be varied by gain adjustment 50 to set the sensitivity of the system to a typical aluminum can to standardize the output of the system.

The same 2.5 volt stable reference signal output from reference voltage generator 52 is passed to amplitude stabilization integrator 54 where it is compared with the signal output from first precision rectifier 38. The difference between these signals is integrated by integrator 54 and the output is passed to analog signal generator 20 such as a crystal oscillator and frequency divider 22. In this way, the amplitude of the drive signal is stabilized over wide ranges of temperature and supply voltage variations which further insures that the gain of amplifier 46 remains constant.

It should be noted that output adjustment 48 and gain adjustment 50 are completely noninteractive. The output adjustment is made when sense coil 30 is connected to the circuit which allows minor variations in the parameters of sense coil 30 to be accommodated. The gain adjustment is made by placing an all aluminum can at substantially the center of sense coil 30 and adjusting the signal output from amplifier 46 to a predetermined reference value. This provides standardization from system to system and simplifies processing of the output signal by a control computer (not shown).

A series of measurements have been performed to discriminate the metallic composition of various types of cans using a closely wound 3 inch diameter 3.2 mH sense coil. Each can was passed substantially through the center of the sense coil and the signal output from differential instrumentation amplifier 46 was measured at 0.5 inch intervals as the can was passed through sense coil 30. FIGS. 2-7 are plots illustrating the results of the measurements.

Figure 1A:
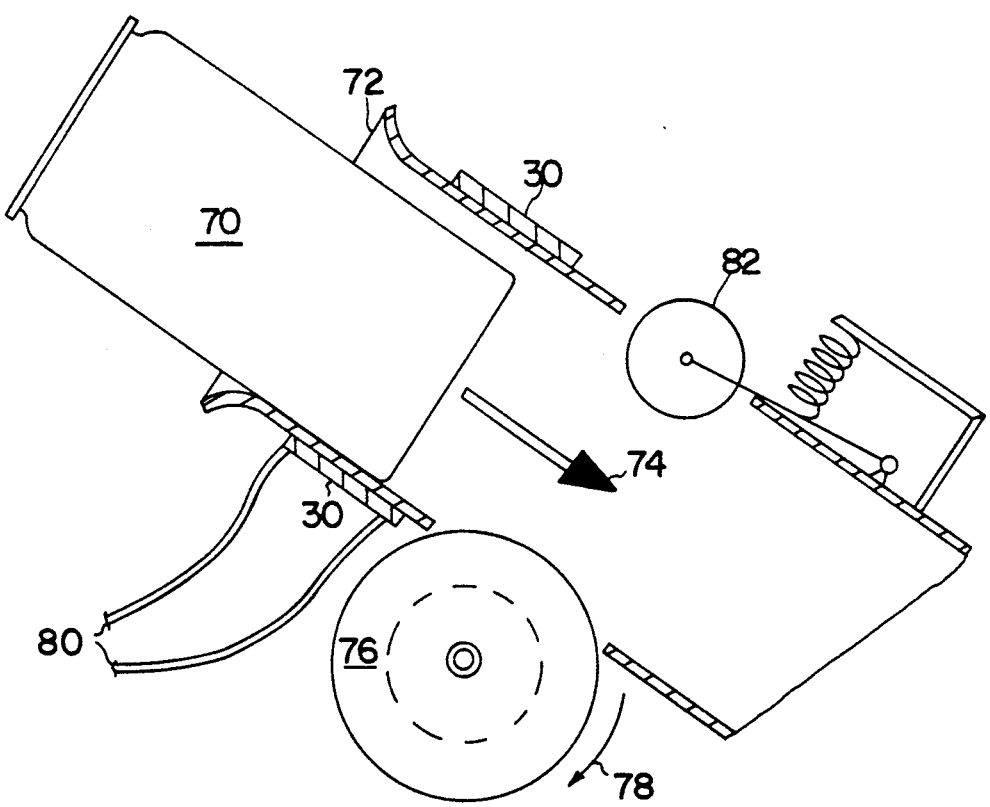

FIG. 1a depicts how a typical beverage can object 70 is inserted into the mouth of a support chute 72 and is drawn, for example, by gravity in direction 74 into contact with a transporting means in the form of a drive wheel 76, rotating in direction 78, which transports the object 70 substantially through the center of sense coil 30 previously shown in FIG. 1. Sense coil leads 80 and idler wheel 82, spring loaded to contact the object, are also shown.

Figure 2:
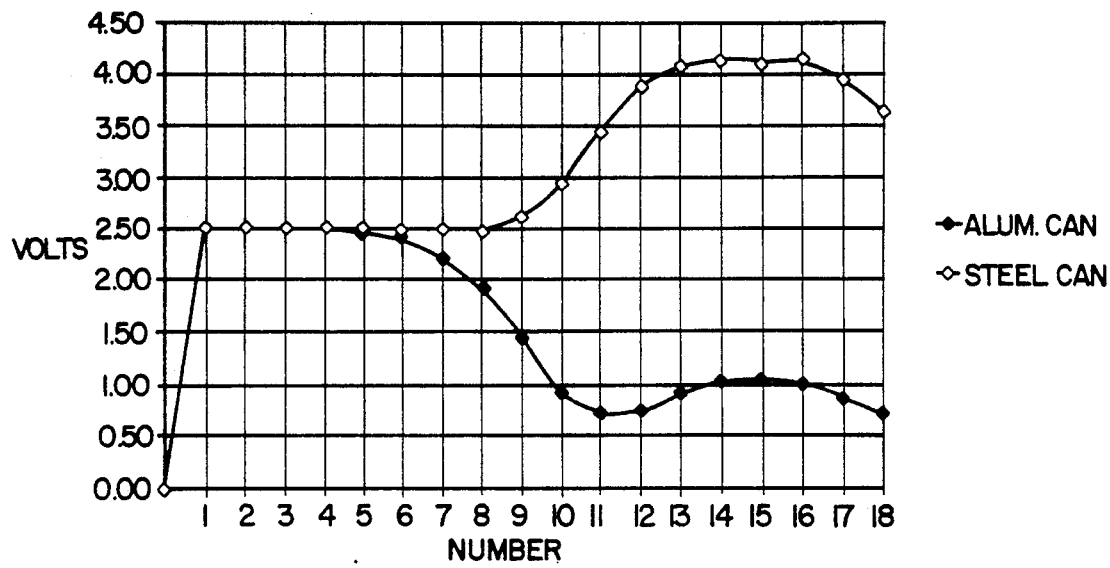
FIG. 2 is a plot illustrating the output of the system illustrated in FIG. 1 for two types of containers.

FIG. 2 compares the signal output in the case of an all aluminum can passed substantially through the center of sense coil 30 to the signal output in the case of an all steel can passed substantially through the center of sense coil 30. The difference between the signal output in each of these cases is readily observable and may be used to identify the composition of the can. Specifically, the signal output in the case of the all aluminum can decreases as the end of the can passes through the center of the sense coil 30. This characteristic can be used to determine the position of the can in sense coil 30 by the control computer.

Figure 3:
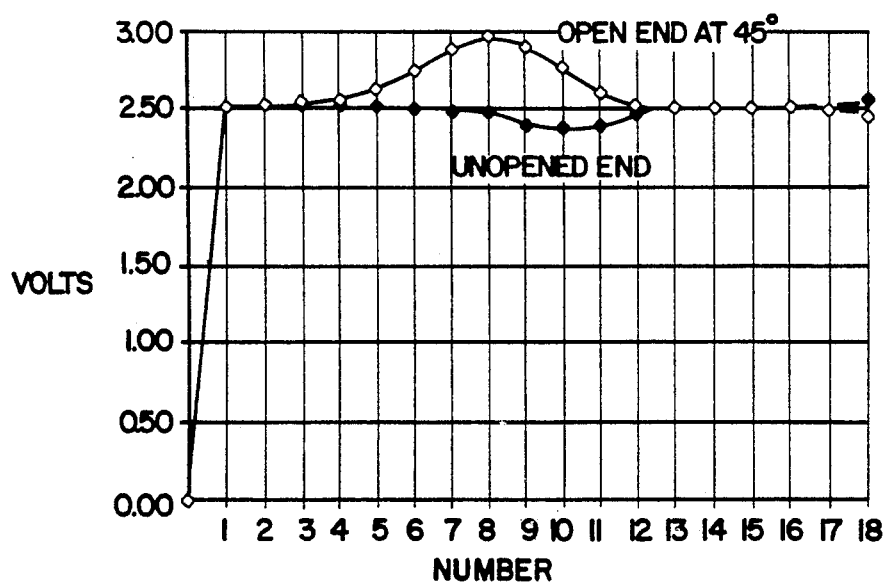
FIG. 3 is a plot illustrating the output of the system illustrated in FIG. 1 for two types of containers.

FIG. 3 plots the signal output in the case of a typical frozen juice can having cardboard sides and steel end caps passed through sense coil 30. The can was passed through sense coil 30 with both ends closed and again with one end open at 45°. With both ends closed, each end is perpendicular to the axis of sense coil 30 and eddy current losses mask the increase in self inductance of sense coil 30 caused by the presence of the steel end caps. When one end of the can is open at 45°, the increase in self inductance causes a detectable increase in the signal output from amplifier 46.

Figure 4:
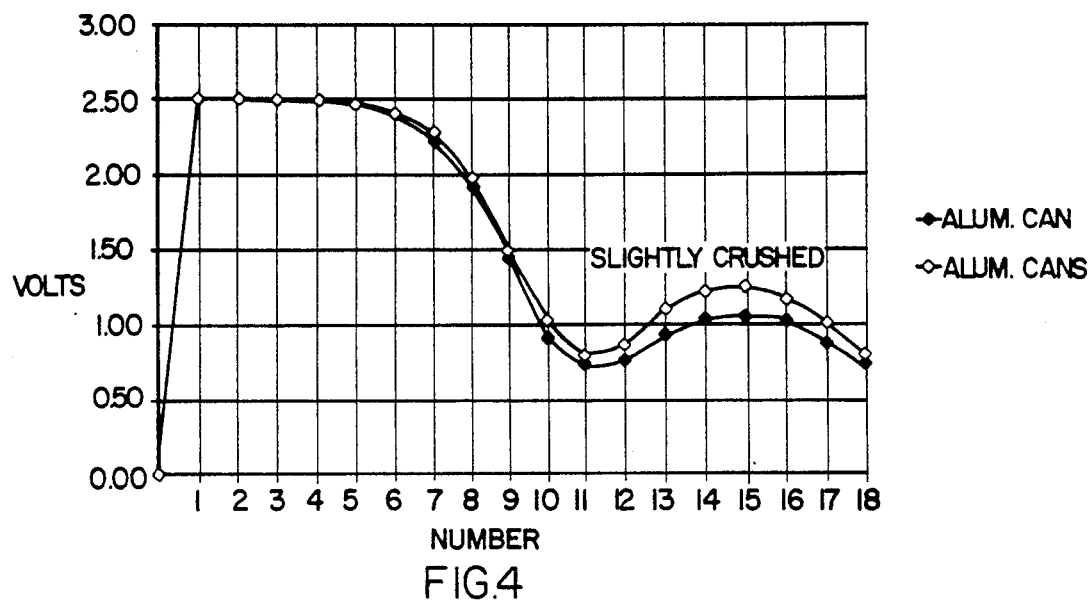
FIG. 4 is a plot illustrating the output of the system illustrated in FIG. 1 for two types of containers.

FIG. 4 illustrates the effect of slightly crushing the body of a can passed through sense coil 30 and compares the signal output in the case of a slightly crushed can to the signal output in the case of an uncrushed can. Crushing the can reduces the effective diameter of the can and therefore decreases the losses in self inductance of sense coil 30 as the crushed can passes through the coil.

Figure 5:
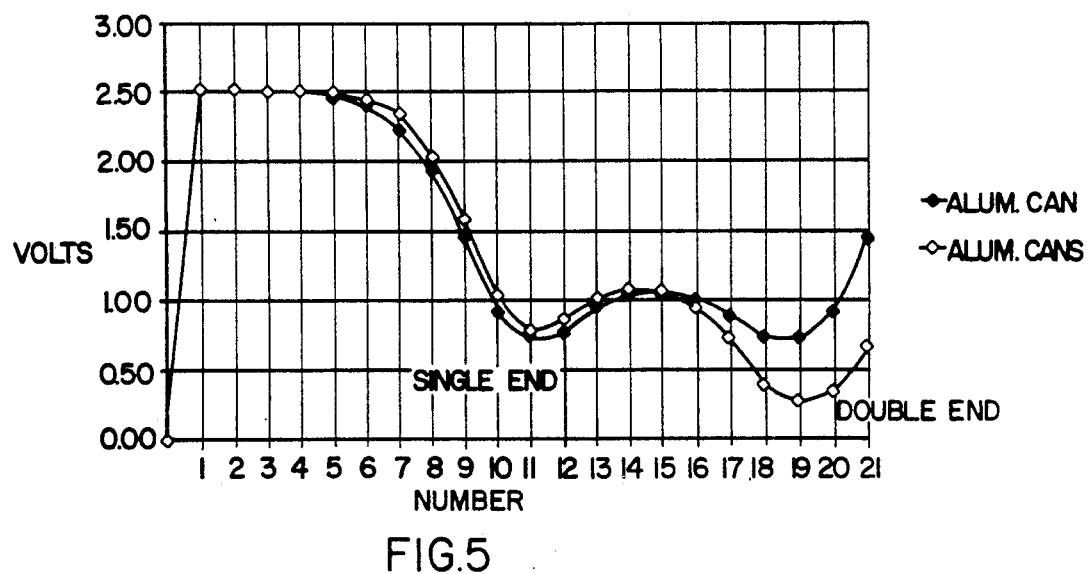
FIG. 5 is a plot illustrating the output of the system illustrated in FIG. 1 for two types of containers.

FIG. 5 is a plot illustrating the signal output in the case of two aluminum cans positioned end-to-end as they pass through sense coil 30 as compared to a single aluminum can passed through sense coil 30. The double end is readily detectable and can be used to identify stacked cans in sense coil 30.

Figure 6:
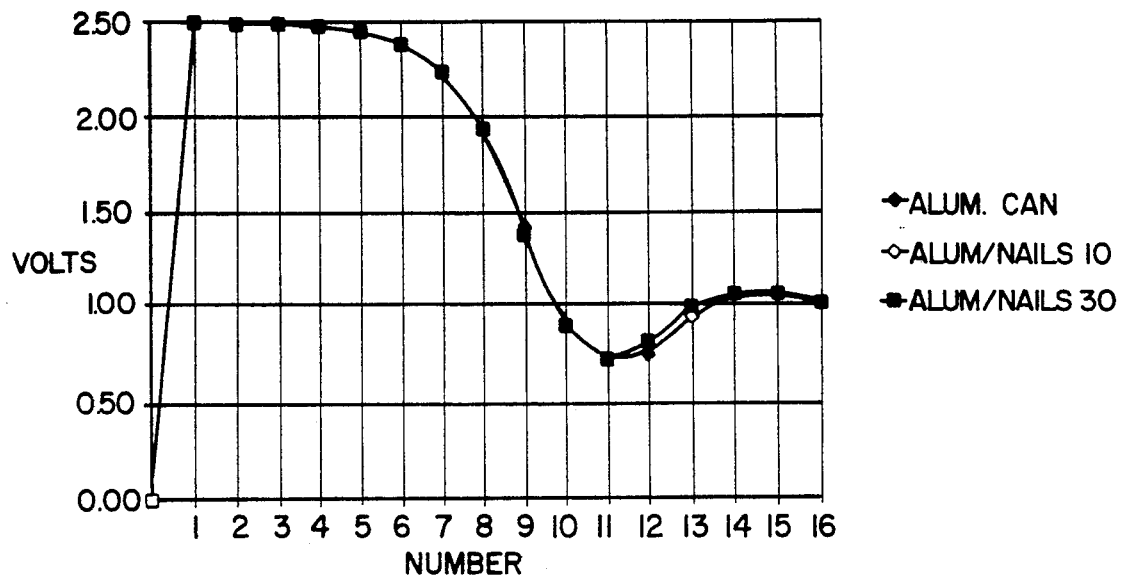
FIG. 6 is a plot illustrating the output of the system illustrated in FIG. 1 for two types of containers.
Figure 7:
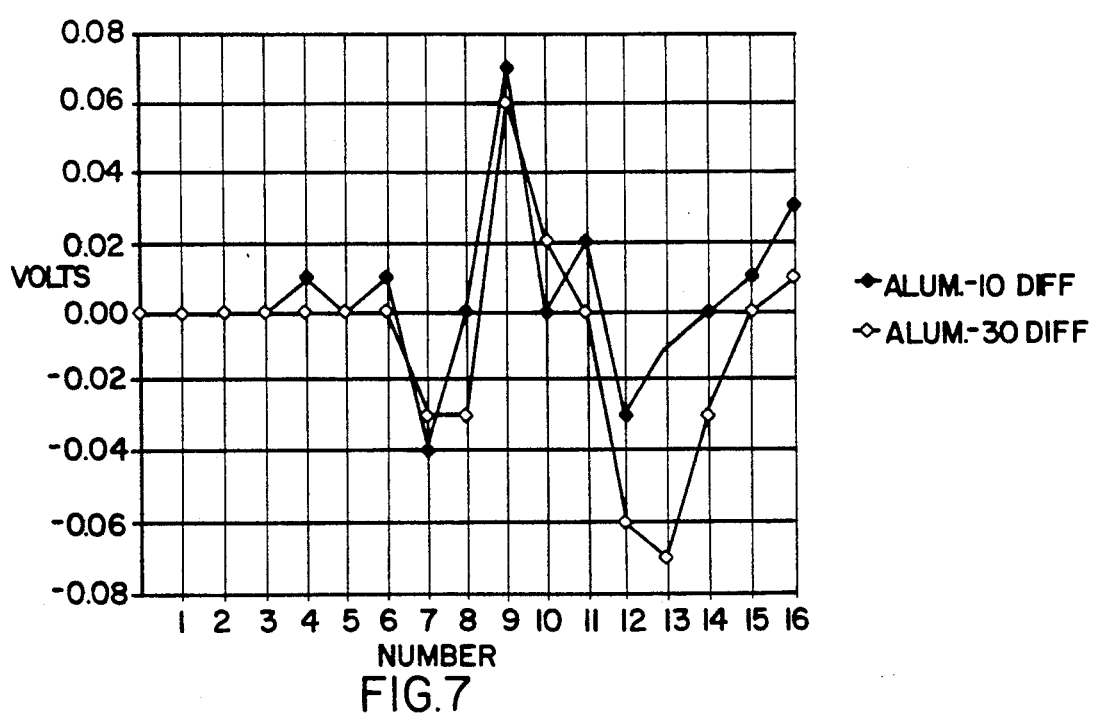
FIG. 7 is a plot illustrating the output of the system illustrated in FIG. 1 for two types of containers.

FIGS. 6 and 7 illustrate the effect of putting 10 and 30 medium size iron nails into an all aluminum can. The shielding effect of the can is such that there is a very small variation in the signal output from amplifier 46 as the can passes through sense coil 30. The primary difference between the case in which an empty aluminum can is passed through sense coil 30 to the case with the aluminum can including the nails is illustrated in FIG. 7.

The ability to detect other metal objects inside the can is improved by using a two frequency system thereby varying the self inductance characteristics of sense coil 30 to maximize discrimination capabilities. For example, a square wave having a frequency much lower than 4,096 Hz could be used to reduce the eddy current losses of the aluminum can compared with the increased self inductance caused by the magnetic materials such as iron and steel. Nonmagnetic materials such as stainless steel, glass, etc., may be detected on the basis of mass.

Other embodiments of the invention will be apparent to those skilled in the area from consideration of the specification and practice of the invention disclosed herein. It is intended that the specification and examples be considered as exemplary only, with a true scope and spirit of the invention being indicated by the following claims.

What is claimed is:

1. A device for discriminating metal in an object, comprising:
   a sense coil, said object being positioned substantially in the center of the said coil;
   means for generating an electrical signal having a predetermined frequency and applying said signal to said sense coil;
   means for measuring the self inductance of said sense coil as a function of the voltage across said coil;
   means for comparing said measured self inductance with a reference voltage to discriminate metal in said object; and
   first and second filter and rectifier circuits, said voltage across said coil being applied to said first circuit and said reference voltage being applied to said second circuit, outputs of said first and second circuits being applied to said comparing means.

2. A device according to claim 1, further comprising means for transporting said object substantially through the center of said sense coil, said measuring means measuring said self inductance when said object is positioned at a plurality of predetermine depositions within said coil.

3. A device according to claim 1, wherein said generating means is a crystal oscillator.

4. A device according to claim 1, wherein said reference voltage is generated by said generating means.

5. A device according to claim 1, wherein said first and second filter and rectifier circuits are substantially identical.

6. A device according to claim 1, wherein further comprising integration means for integrating a difference between the output of said second filter and rectifier circuit and said reference voltage and outputting an integrated signal, and for applying said integrated signal to said generating means.

7. A device for discriminating metal in an object, comprising:
   a sense coil, said object being positioned substantially in the center of said coil;
   means for generating an electrical signal having a predetermined frequency and applying said signal to said sense coil, wherein said predetermined frequency is determined as a function of the metallic composition of said object, and wherein said predetermined frequency is substantially 4096 Hz;
   means for measuring the self inductance of said sense coil as a function of the voltage across said coil, and
   means for comparing said measured self inductance with a reference voltage to discriminate metal in said object.

8. A method of discriminating metal in an object, comprising the steps of:
   positioning said object in substantially the center of a sense coil;
   generating an electrical signal having a predetermined frequency and applying said signal to said sense coil, wherein said predetermined frequency is determined as a function of the metallic composition of said object, and wherein said predetermined frequency is substantially 4096 Hz;
   measuring the self inductance of said sense coil as a function of the voltage across said coil; and
   comparing said measured self inductance with a reference voltage to discriminate metal in said object.

9. A method for discriminating metal in an object, comprising the steps of:
   positioning said object in substantially the center of a sense coil;
   generating an electrical signal having a predetermined frequency and applying said signal to said sense coil;
   measuring the self inductance of said sense coil as a function of the voltage across said coil;
   comparing said measured self inductance with a reference voltage to discriminate metal in said object;
   applying said voltage across said coil to a first filter and rectifier circuit;
   applying said reference voltage to a second filter and rectifier circuit; and
   applying outputs of said first and second circuits to said comparing means.

10. The method as defined in claim 9, wherein said positioning step includes a step of transporting said object substantially through the center of said sense coil, and wherein said measuring step measures said self inductance when said object is positioned at a plurality of predetermined positions within said coil.

11. The method as defined in claim 9, wherein said generating step generates said electrical signal using a crystal oscillator.

12. The method as defined in claim 9, wherein said generating step generates said reference voltage.

13. The method as defined in claim 9, wherein said first and second filter and rectifier circuits are substantially identical.

14. The method as defined in claim 9, further comprising the steps of:
   integrating a difference between the output of said second filter and rectifier circuit and said reference voltage and outputting an integrated signal; and
   applying said integrated signal to said generating means.

15. A device according to claim 1, wherein said predetermined frequency is 4,150 Hz.

16. A method according to claim 9, wherein said generating step includes generating an electrical signal having a frequency of 4,150 Hz.

* * * * *